Aug. 20, 1968    B. J. WALLIS    3,397,799
WORK TRANSFER MECHANISM
Filed Oct. 6, 1966    15 Sheets-Sheet 1

INVENTOR.
BERNARD J. WALLIS
BY
Barnes, Kisselle, Raisch & Choate
ATTORNEYS

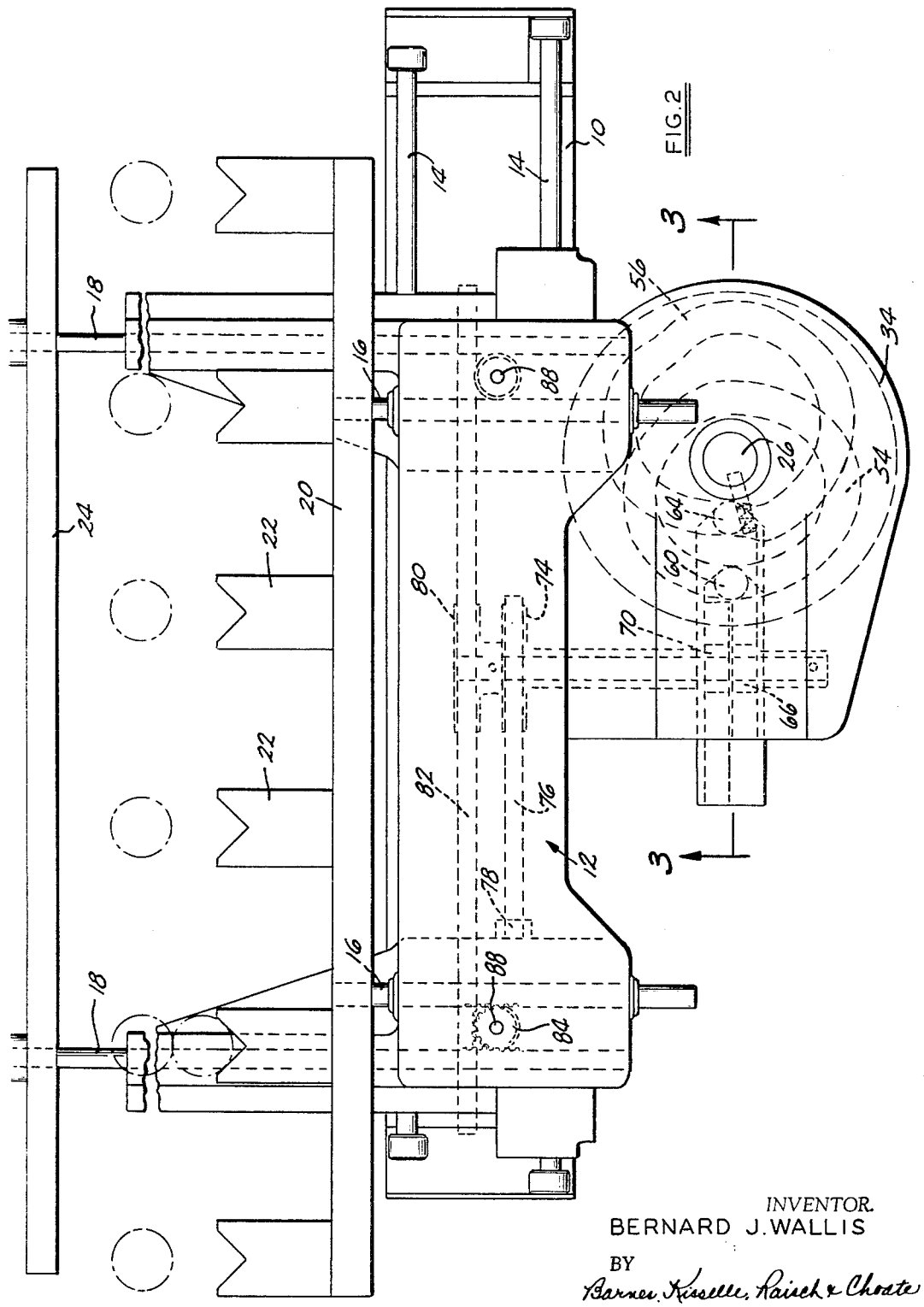

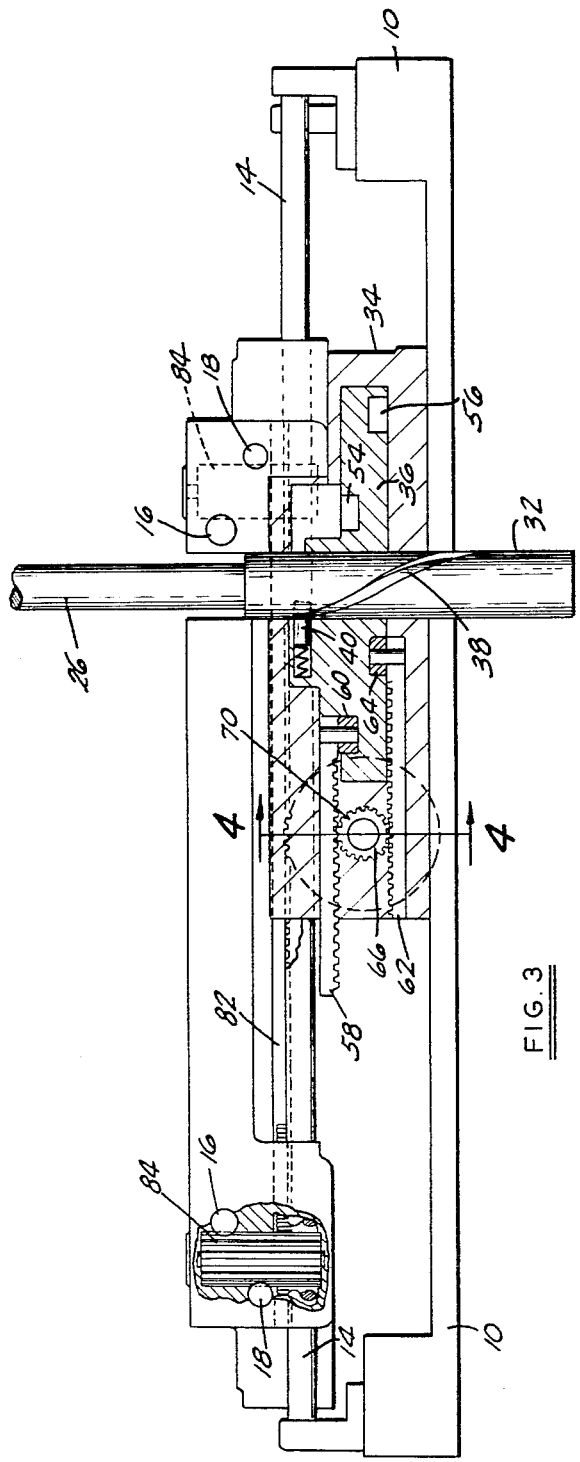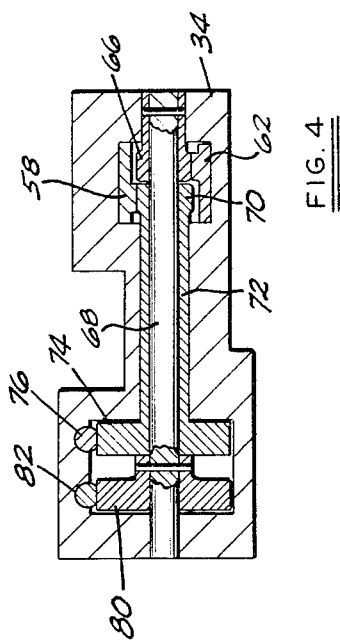

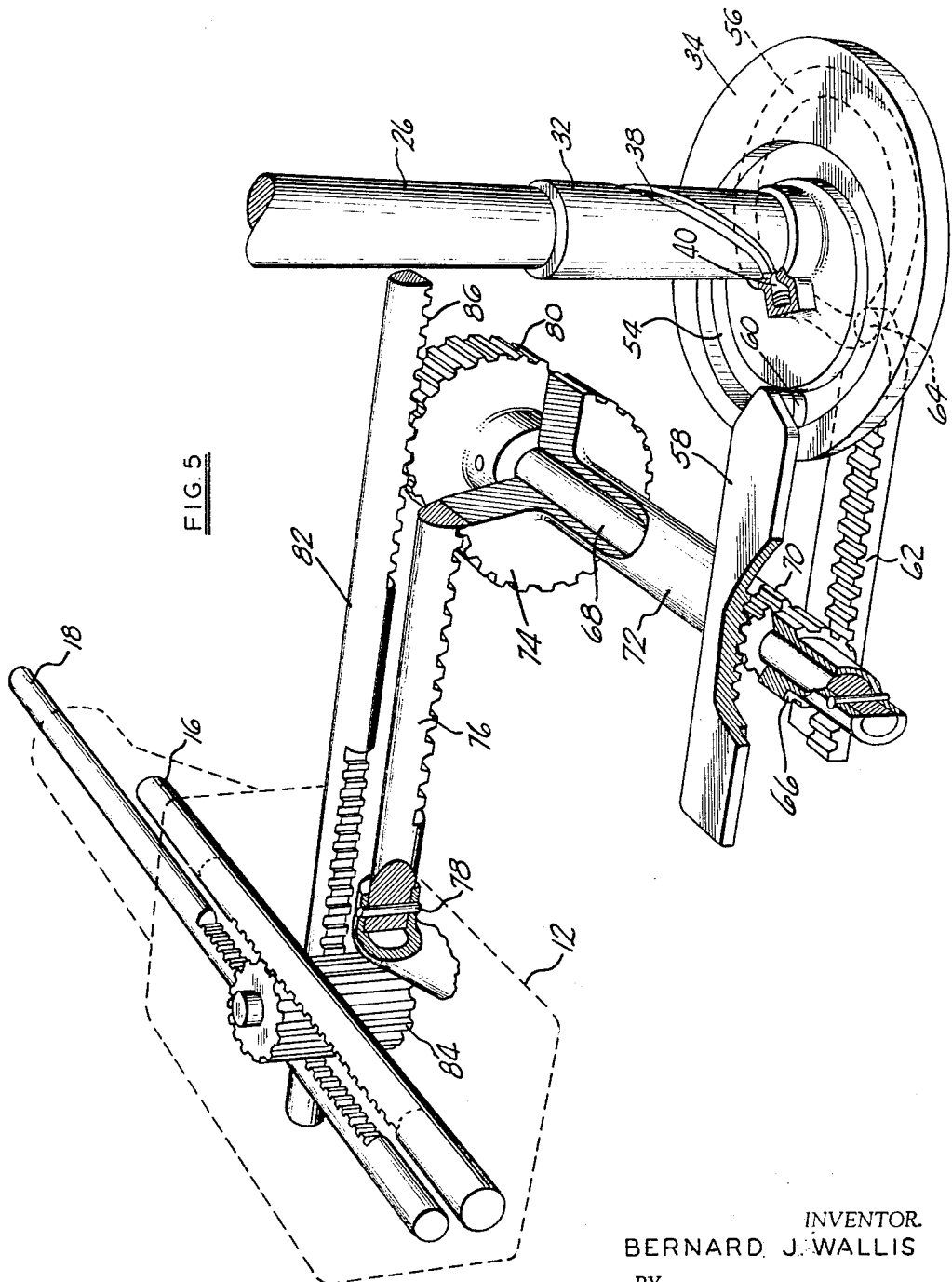

Aug. 20, 1968  B. J. WALLIS  3,397,799
WORK TRANSFER MECHANISM
Filed Oct. 6, 1966  15 Sheets-Sheet 5

INVENTOR.
BERNARD J. WALLIS
BY
Barnes, Kisselle, Raisch & Choate
ATTORNEYS

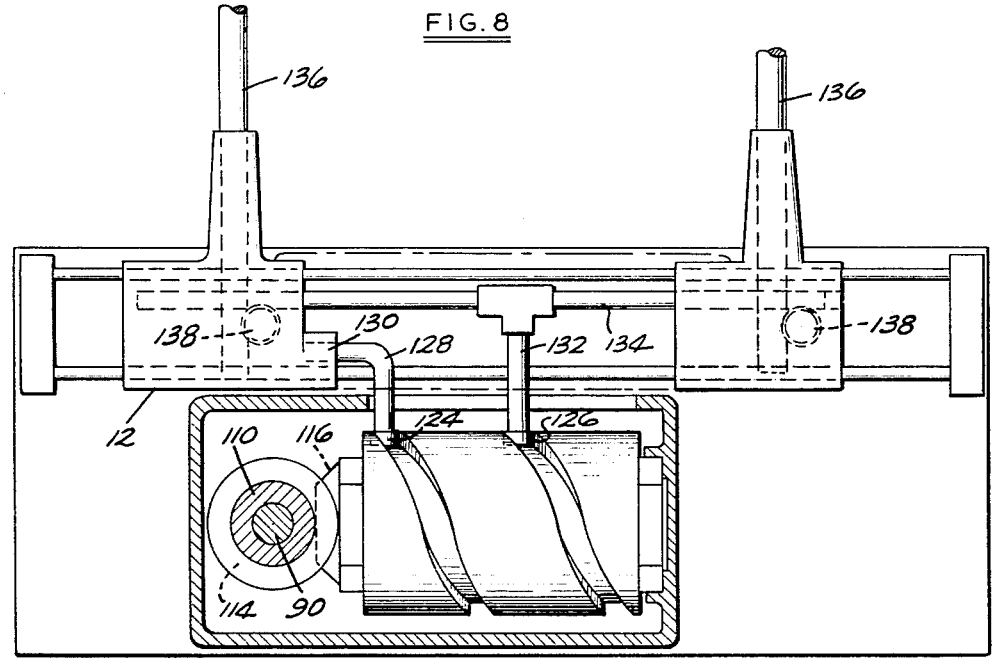
FIG. 8
FIG 9
INVENTOR
BERNARD J. WALLIS
BY
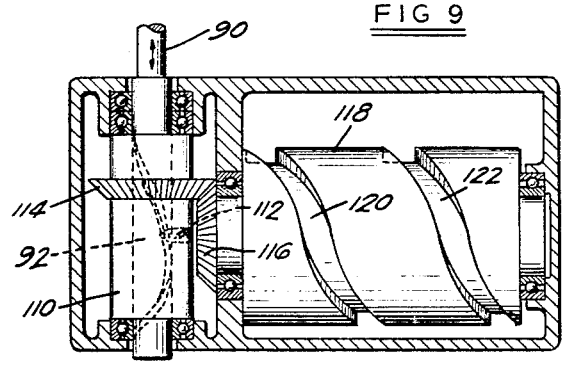
ATTORNEYS

INVENTOR
BERNARD J. WALLIS

Aug. 20, 1968        B. J. WALLIS        3,397,799

WORK TRANSFER MECHANISM

Filed Oct. 6, 1966        15 Sheets-Sheet 8

INVENTOR.
BERNARD J. WALLIS
BY
Barnes, Kisselle, Raisch & Choate
ATTORNEYS

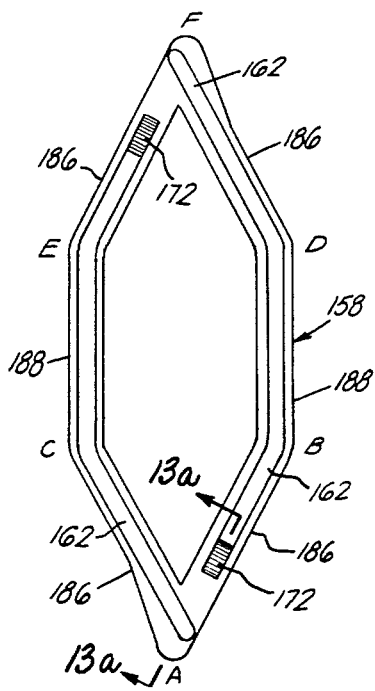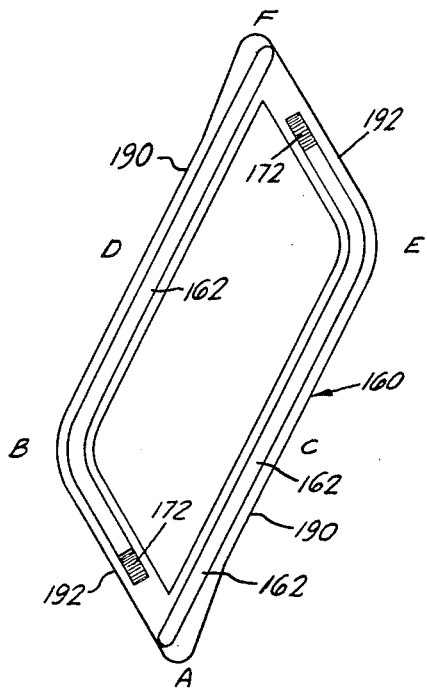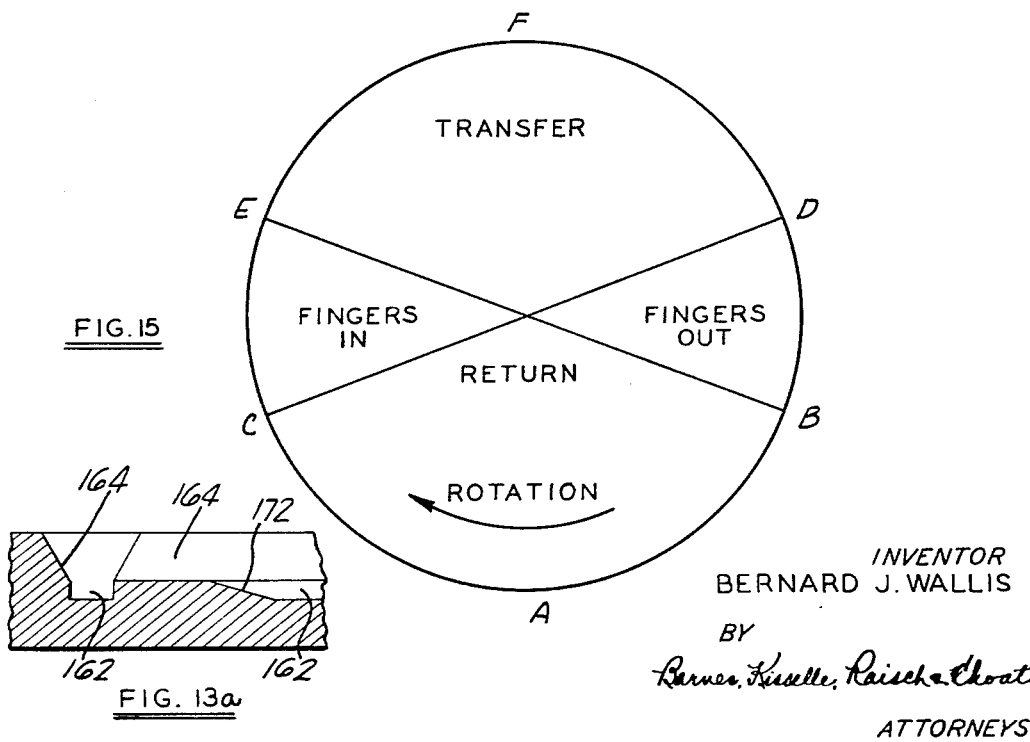

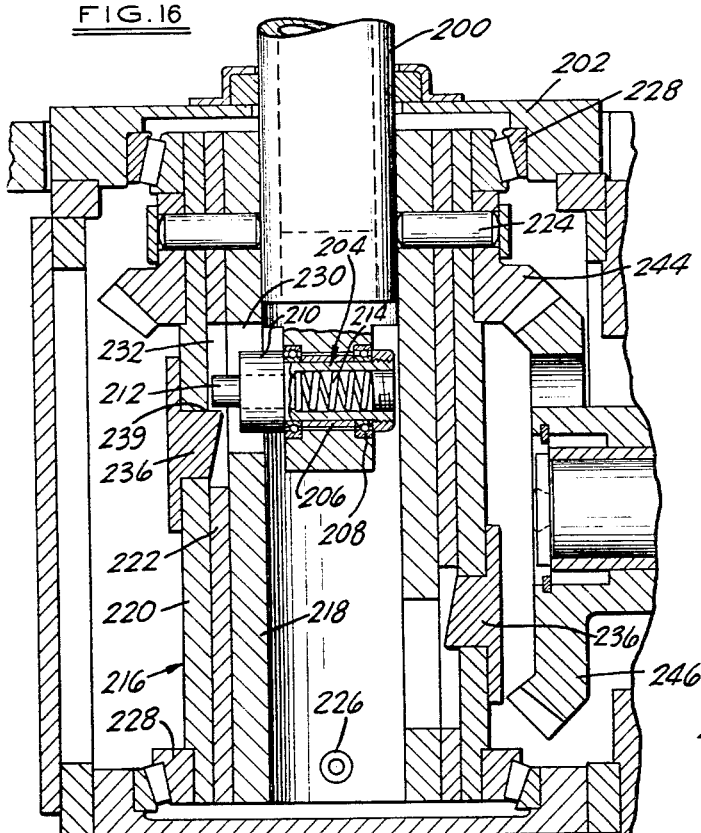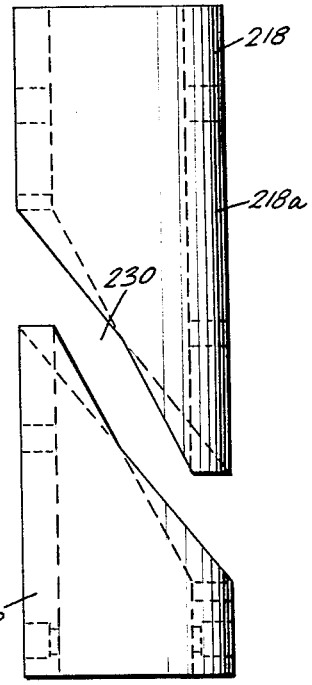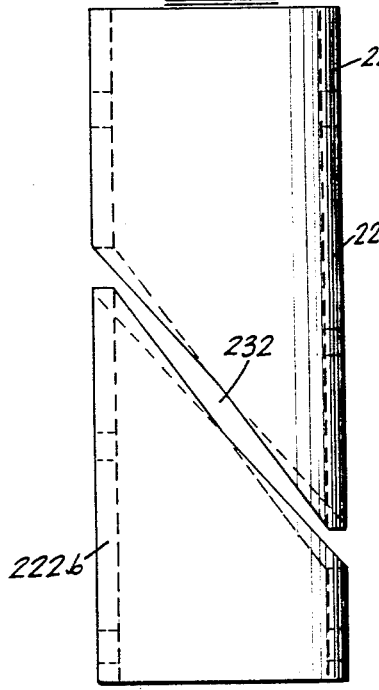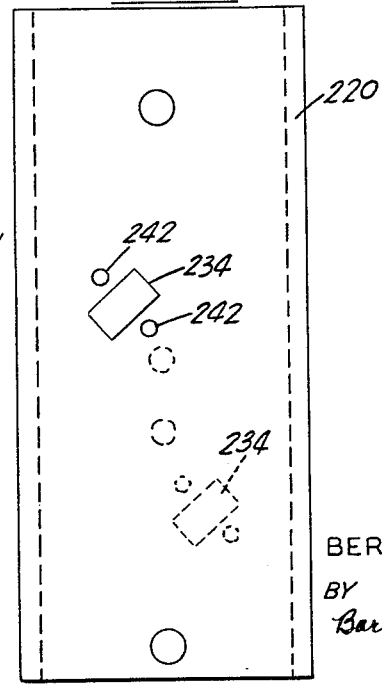

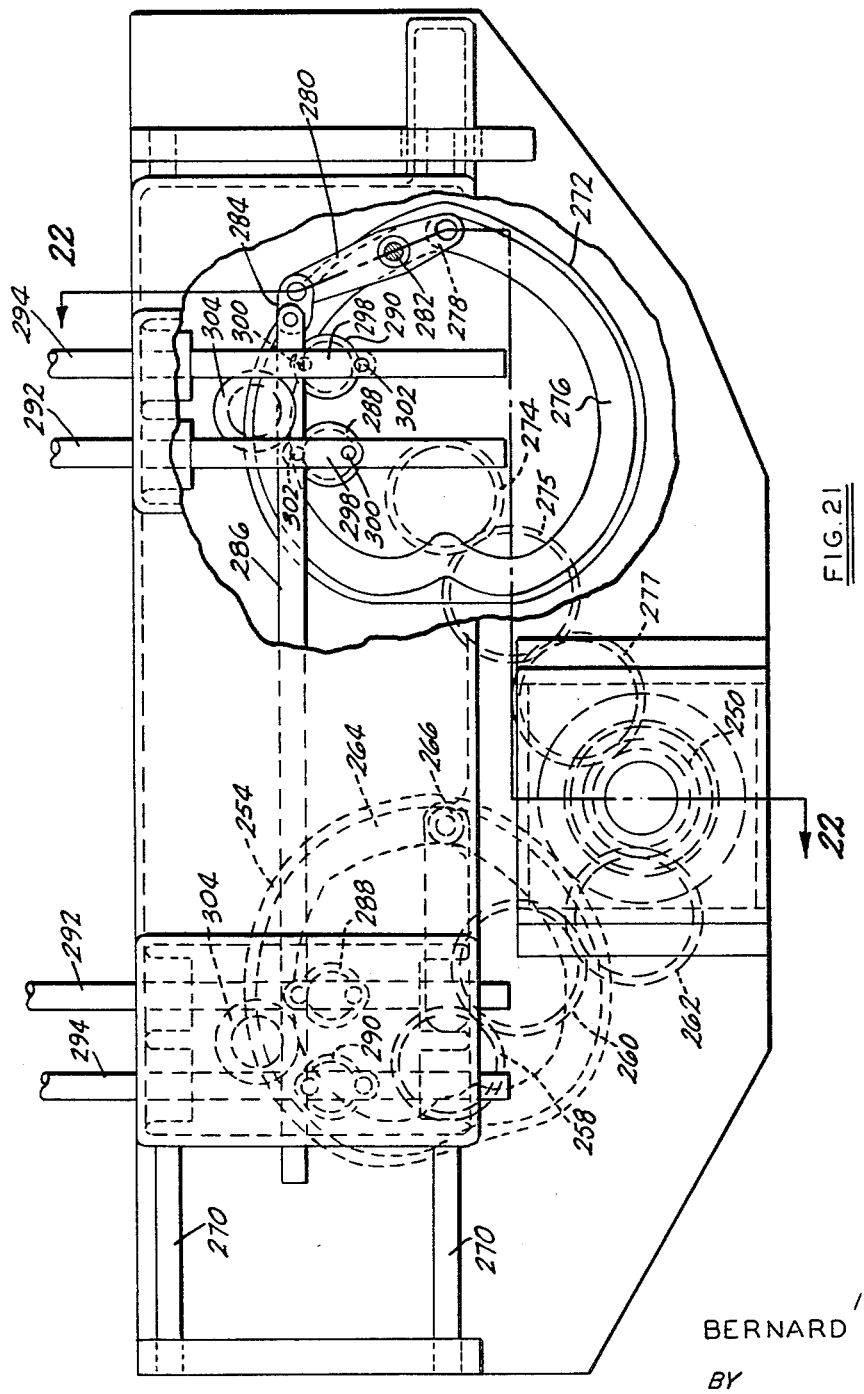

Aug. 20, 1968        B. J. WALLIS         3,397,799
                WORK TRANSFER MECHANISM
Filed Oct. 6, 1966                    15 Sheets-Sheet 12

INVENTOR
BERNARD J. WALLIS
BY
*Barnes, Kisselle, Raisch & Choate*
ATTORNEYS

Aug. 20, 1968  B. J. WALLIS  3,397,799
WORK TRANSFER MECHANISM
Filed Oct. 6, 1966  15 Sheets-Sheet 13

*INVENTOR*
BERNARD J. WALLIS

*ATTORNEYS*

Aug. 20, 1968  B. J. WALLIS  3,397,799
WORK TRANSFER MECHANISM
Filed Oct. 6, 1966  15 Sheets-Sheet 15

INVENTOR
BERNARD J. WALLIS
BY
Barnes, Kisselle, Raisch & Choate
ATTORNEYS

United States Patent Office 3,397,799
Patented Aug. 20, 1968

3,397,799
WORK TRANSFER MECHANISM
Bernard J. Wallis, % Livernois Engineering Co., 25200
Trowbridge Ave., Dearborn, Mich. 48124
Filed Oct. 6, 1966, Ser. No. 584,895
23 Claims. (Cl. 214—1)

This invention relates to work transfer mechanisms for punch presses. More specifically, the invention has to do with a mechanism for indexing workpieces progressively through the successive stations of a multi-station die.

Generally speaking, such transfer devices normally include a carriage or slide which is adapted to be advanced and retracted through a stroke corresponding to the distance between successive stations and a plurality of work gripping fingers or bars shiftably mounted on the carriage or slide for gripping and releasing the workpieces as they are transferred between successive stations. In the normal transfer cycle, the work gripping members are actuated to shift inwardly to grip the workpieces at each station. The slide or carriage is then advanced through its stroke to bodily index each workpiece to the next successive station. Thereafter, the fingers are retracted to release the workpieces and finally the carriage or slide is retracted to its starting position.

With respect to the manner in which such transfer devices are driven, they are normally classified into three types, namely: ram-driven, cylinder-driven and cam-driven. In a ram-driven unit the ram of the press is connected with a vertically reciprocating rack which is connected through suitable gearing with the carriage or slide and the work gripping fingers. While this type of unit has the advantage that the same transfer mechanism may be used on different presses, it also has several disadvantages. Since the carriage and work gripping fingers are driven by the vertically reciprocating rack which is in turn driven by the vertically reciprocating ram, it follows that the cycle of the transfer mechanism, that is, the forward and retracting movement of the carriage and the inward and retracting movement of the work gripping fingers, is restricted to the sequence obtainable from a vertically driven ram. When the ram is at its bottom dead-center position, the dies are closed and therefore there must be a dwell in the operation of the transfer unit to enable the dies to open on the upstroke of the ram before the work gripping fingers can be projected inwardly to engage the workpieces.

Accordingly, in a ram-driven unit of the type described there is normally a lost-motion connection between the vertical reciprocating rack and the vertically reciprocating ram so that there is a dwell in the transfer mechanism when the ram approaches its top and bottom dead-center positions. On the up stroke of the ram, after the dwell period is terminated, the work gripping fingers are moved inwardly to engage the work-pieces and then the carriage or slide is advanced until the ram reaches its top dead-center position. On the down stroke of the ram, there is an initial dwell before the fingers are retracted and then the slide or carriage is returned to its starting position. Thus, in a ram-driven unit there is the disadvantage of a necessary dwell period when the transfer mechanism remains idle while the press ram is moving vertically and there is the further disadvantage that the work gripping fingers release the workpieces long before the workpieces are engaged by the closing die. Furthermore, a ram-driven unit of the type described has the inherent limitation that the direction of travel of the carriage can be reversed only in response to the reversal of the direction of reciprocation of the ram-driven gear rack.

In a cylinder-driven transfer mechanism the transfer mechanism is completely divorced from and independent of the ram of the press and the transfer cycle is therefore not restricted to that obtainable with a vertically reciprocating ram. However, in a cylinder-driven unit it is necessary to incorporate a very sophisticated pneumatic or hydraulic valving and electrical circuitry in order to actuate the transfer mechanism with the required accelerating and decelerating motions. Because of the valving and electrical circuitry required, a cylinder-driven transfer unit is almost invariably limited to use on only one assigned press. In addition, a cylinder-driven unit is by necessity a relatively slow operating unit and cannot, therefore, be utilized efficiently in a high speed press. A cylinder-driven transfer unit, however, does have the advantage of eliminating the dwell periods required in a ram-driven unit and also the advantage of being able to advance and retract the slide or carriage while the ram is moving through top and bottom dead-center positions.

In a cam-driven type of transfer mechanism a rotary cam is driven by means of a chain or a propeller shaft from the end of the crank shaft of the press. The cam in turn actuates the carriage or slide and the work gripping fingers. A cam-driven unit possesses all the advantages of a cylinder-driven unit and, in addition, is capable of operating at a very high speed. A cam-driven transfer mechanism of this type does have the disadvantage, however, of being integrally connected with the press itself and, therefore, a particular transfer mechanism is generally limited in its use to an assigned press.

It is an object of the present invention to provide a transfer mechanism which has all the advantages of a ram-driven unit and a cam-driven unit but none of the disadvantages of either. In other words, this invention has for its primary object the provision of a die transfer mechanism which is capable of operating at a very rapid rate, which can be transferred when desired from one press to another and which enables the cycle of the carriage and fingers to be varied independently of the travel of the ram.

More specifically, the present invention contemplates a die transfer mechanism which is driven by a ram-driven reciprocating element which is designed to convert reciprocating motion of the ram to a rotating motion in one direction of one or more cams. Since the cam means are rotated continuously in one direction in response to vertical reciprocation of the ram, the cycle of the carriage and work gripping fingers as well as the acceleration and deceleration of the carriage can be controlled exclusively by the contours of the cams independently of the direction of travel of the ram and its position at any particular point in its stroke. In other words, with the die transfer mechanism of the present invention the necessity for a dwell period is eliminated and the transfer and retracting movements of the slide or carriage can be performed while the ram is traveling through its top and bottom dead-center positions. In addition, since the vertically reciprocating cam driver may be mechanically connected with the ram, the transfer mechanism itself can be used with different presses as the need arises.

Other objects, features and advantages of transfer mechanisms embodying the present invention will become apparent from the following description and drawings in which:

FIGURE 2 is a plan view of the transfer mechanism shown in FIG. 1.

FIGURE 3 is a sectional view taken along the line 3—3 in FIG. 2.

FIGURE 4 is a sectional view taken along the line 4—4 in FIG. 3.

FIGURE 5 is a fragmentary perspective view, with parts broken away, of the drive arrangement for the transfer mechanism shown in FIGS. 1 through 4.

FIGURE 8 is a fragmentary plan view, with parts in section, showing a further embodiment of transfer mechanism embodying the present invention.

FIGURE 9 is a sectional view showing the drive arrangement for the barrel cam illustrated in FIG. 8.

FIGURE 13 is a schematic view of the cam groove on the driver for the carriage of the embodiment shown in FIG. 10.

FIGURE 13a is a sectional view along the line 13a—13a in FIG. 13.

FIGURE 14 is a schematic view illustrating the shape of the cam groove for the driver for the work gripping fingers of the embodiment illustrated in FIG. 10.

FIGURE 15 shows a typical cycle diagram for a transfer mechanism embodying the present invention.

FIGURE 16 is a fragmentary sectional view showing a modified form of vertical driver.

FIGURES 17, 18 and 19 are side elevational views of sleeves illustrated in FIG. 16.

FIGURE 20 is a perspective view of the cam stops shown in FIG. 16.

FIGURE 21 is a fragmentary plan view, partly in section, showing still another modification of transfer mechanism embodying the present invention.

Figure 1:
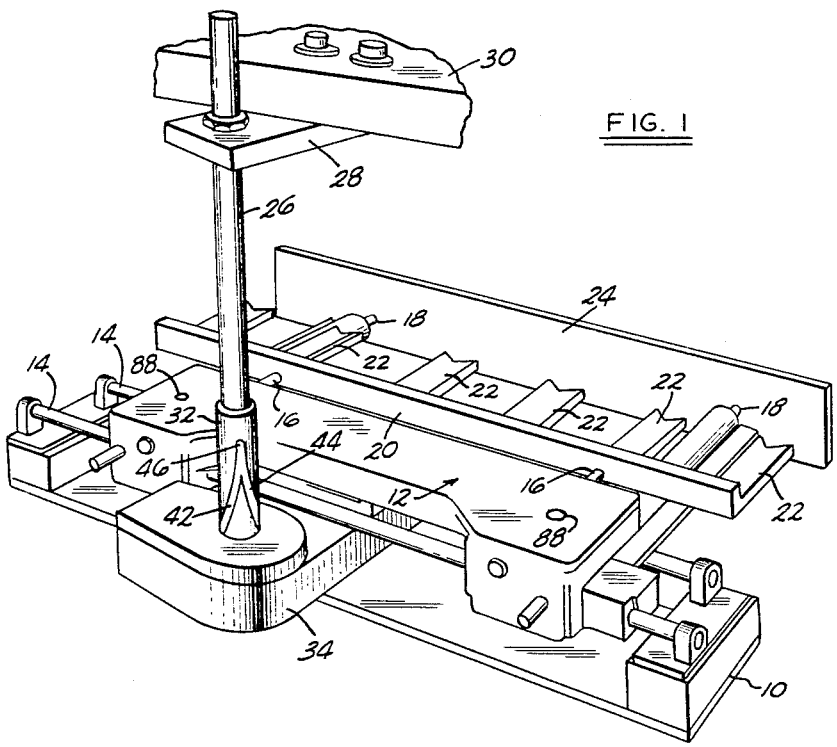
FIGURE 1 is a perspective view of one embodiment of die transfer mechanism embodying the present invention.

Referring first to FIGS. 1 through 5, the transfer mechanism of the present invention includes a base 10 on which a carriage 12 is supported for lengthwise movement by means of a pair of guide bars 14. Carriage 12 comprises a housing in the form of a casting on which two pair of finger operating rods 16, 18 are supported in suitable bearings for reciprocation in a direction transversely to the direction of travel of carriage 12 on guide bars 14. Rods 16 are interconnected by a finger bar 20 on which a plurality of work gripping fingers 22 are mounted. Rods 18 are interconnected by a back-up bar 24. Means, described below, are provided for actuating carriage 12 and rods 16, 18 such that fingers 22 and back-up bar 24 are adapted to move toward each other to grip workpieces therebetween. Thereafter, carriage 12 is shifted longitudinally on guide bars 14 to index the workpieces a predetermined distance corresponding to the distance between successive stations on a multi-station die. Fingers 22 and back-up bar 24 are then moved laterally apart to release the workpieces, and finally carriage 12 is retracted to its starting position.

In the embodiment illustrated in FIGS. 1 through 5, the drive means includes a vertically extending shaft 26 which is solidly connected to a bracket 28 fixedly mounted on the ram 30 of a punch press. The lower end of shaft 26 is fashioned as a cylindrical cam 32 which is adapted to reciprocate vertically through a gear box 34 on base 10. Within gear box 34 there is journalled a cam plate 36 which is centrally apertured to slidably receive the cylindrical cam 32 at the lower end of shaft 26. Cam 32 is formed with a cam groove 38 in the outer cylindrical surface thereof. Within the hub of cam plate 36 there is mounted a spring pressed pin 40 engaged in cam groove 38. In the embodiment illustrated in FIGS. 1 through 5 cam groove 38 comprises two arcuate portions which extend axially and circumferentially on cam 32 and which intersect at their upper and lower ends. The intersection of these two cam grooves at their upper ends is illustrated in FIG. 1 and is designated 46.

Figures 6, 7:
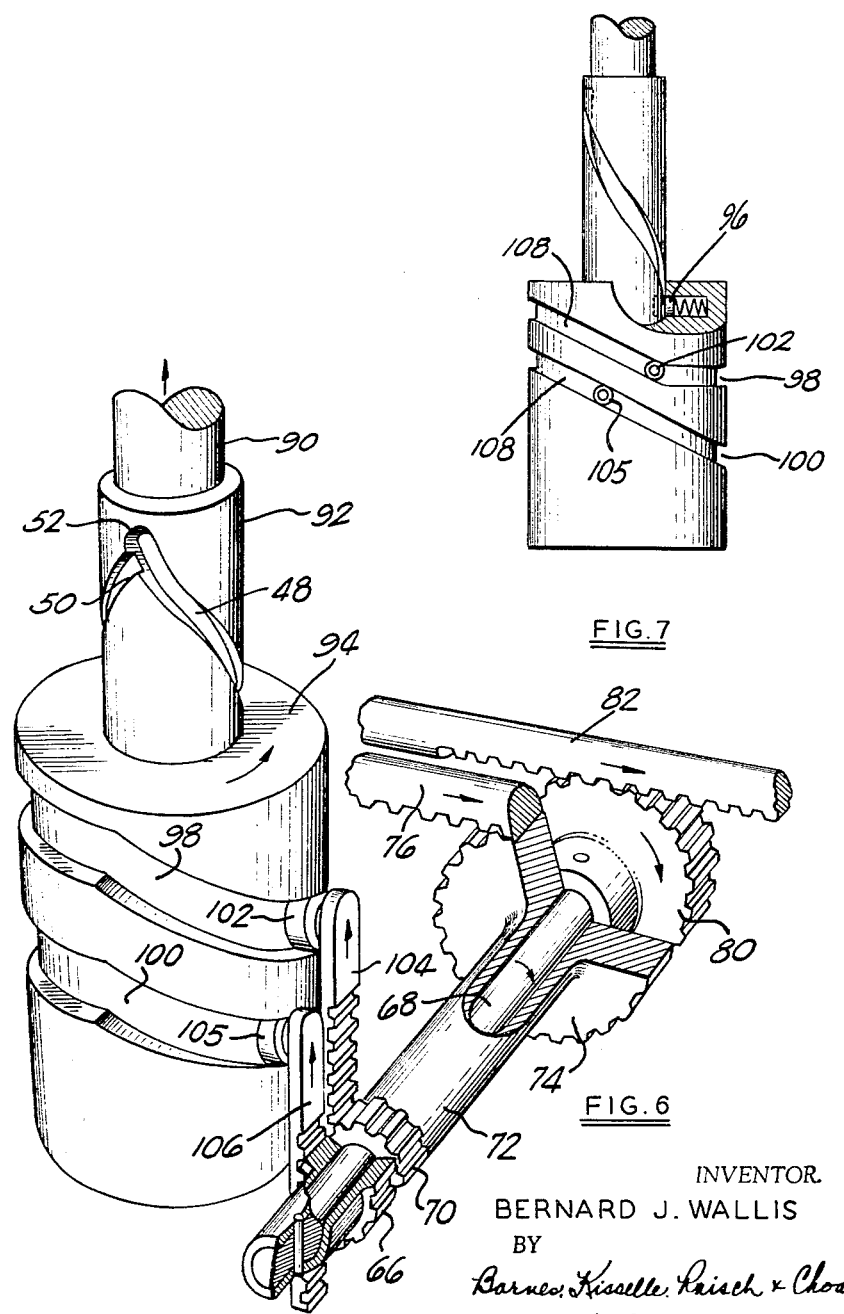
FIGURE 6 is a fragmentary perspective view of another embodiment of the drive mechanism for the transfer unit.
FIGURE 7 is an elevational view of the barrel cam and driver shown in FIG. 6.
Figure 10:
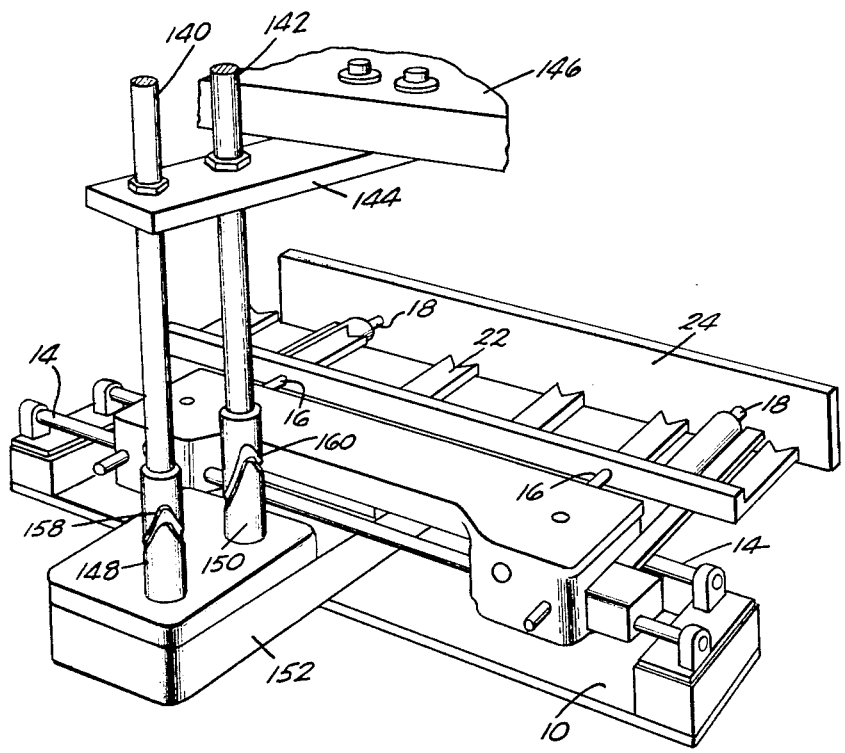
FIGURE 10 is a further embodiment of a transfer mechanism embodying the present invention and showing the use of two vertical driver elements.
Figure 12:
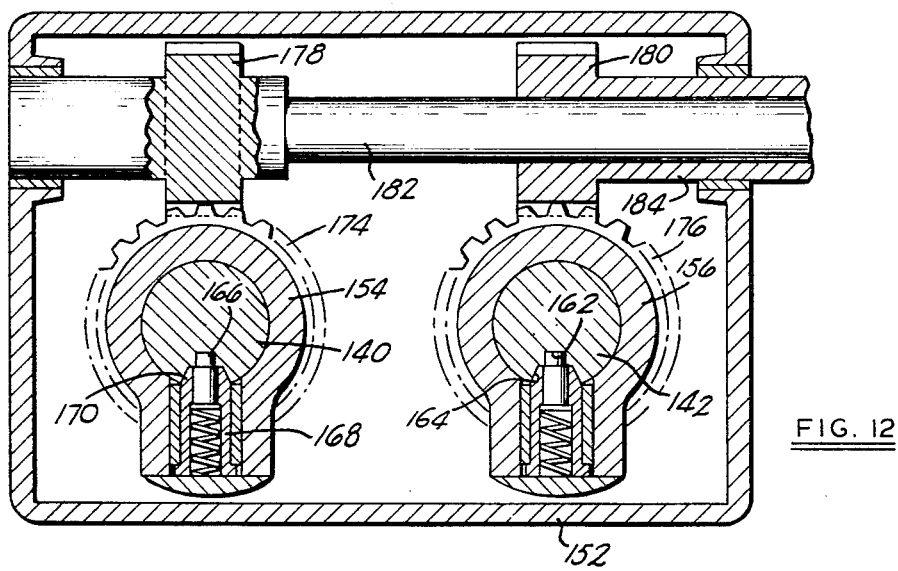
FIGURE 12 is a sectional view along the line 12—12 in FIG. 11.
Figure 11:
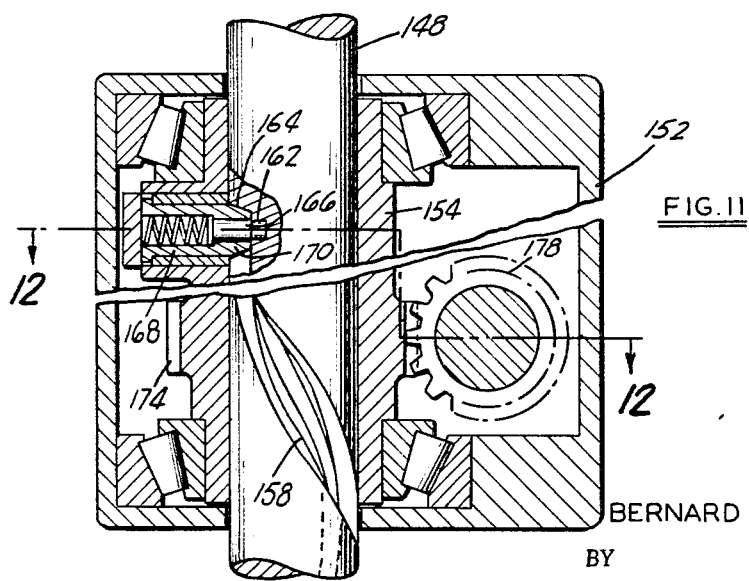
FIGURE 11 is a fragmentary vertical sectional view of the gear box employed in the embodiment illustrated in FIG. 10.

For a specific showing of the intersection between the two cam groove portions, reference is made to FIG. 6. While FIG. 6 shows a slightly modified form of drive arrangement, the cam groove and spring pressed pin arrangement engaging in the groove is substantially the same as that shown in FIGS. 1 through 5. Thus, in the case of the two cam grooves 48, 50 illustrated in FIG. 6 it will be observed that, where these grooves intersect at the upper end of the cylindrical cam, groove 48 is deeper than groove 50 so that a step 52 is formed at the intersection of the grooves. At the lower end of the cylindrical cam the intersection of grooves 48 and 50 is such that groove 48 is shallower than groove 50 so as to form therebetween a step or shoulder similar to step 52.

Now referring back to FIGS. 1, 3 and 5 the cam groove arrangement is such that, when cylindrical cam 32 is driven downwardly, pin 40 on cam plate 36 by reason of its engagement in groove 38 causes cam plate 36 to rotate. When pin 40 reaches the intersection 46 adjacent the upper end of cam 32 and ram 30 starts to ascend, the pin follows the deeper cam groove so as to continue rotation of cam plate 36 in the same direction it was rotating when the ram was descending. Thus, as the ram reciprocates vertically, cam plate 36 is caused to rotate continuously in one direction.

Cam plate 36 has a cam groove 54 formed in the upper face thereof and a second cam groove 56 formed in the lower face thereof. A gear rack member 58 has a cam follower 60 in cam groove 54, and a second gear rack member 62 has a cam follower 64 engaged in the lower cam groove 56. Rack member 62 engages with a pinion 66 pinned to a shaft 68 and rack member 58 meshes with a pinion 70 formed at one end of a sleeve 72 rotatably supported on shaft 68. The other end of sleeve 72 carries a pinion 74 which meshes with a rack bar 76. Rack bar 76 is fixedly connected to carriage 12 as by a pin 78. The end of shaft 68 opposite pinion 66 has a pinion 80 fixed thereon which meshes with a rack bar 82. One end of rack bar 82 meshes with a pinion 84.

Finger rods 16 and 18 mesh with pinion 84 on diametrically opposite sides thereof. The gear rack portion 86, with which the pinion 80 is in mesh, is formed generally at the central portion of rack bar 82. Rack bar 82 extends substantially the full length of carriage 12. Although only one end of rack bar 82 is illustrated in FIG. 5, it will be appreciated that the other end thereof engages a pinion 84 which in turn drives the other two finger rods 16, 18 in the manner illustrated. The ends of the stub shafts on which the two pinions 84 are mounted are illustrated in FIGS. 1 and 2 and designated 88.

As mentioned above, when ram 30 reciprocates vertically, drive shaft 26, being rigidly connected therewith, reciprocates cylindrical cam 32 vertically through the gear box. This causes cam plate 36 to rotate continuously in one direction. Since the longitudinal movement of carriage 12 on guide bars 14 is controlled by the shape of cam groove 54 and the movement of finger rods 16, 18 is controlled by the shape of cam groove 56, it follows that these two movements can be controlled independently of one another and independently of the vertical position of ram 30.

For example, while cam follower 60 is engaged with portions of cam groove 54 which are concentric to the axis of rotation of cam plate 36, no movement of carriage 12 will occur. But when cam follower 60 is engaged with portions of cam groove 54 which are eccentric to the axis of shaft 26, carriage 12 will be shifted longitudinally on guide bars 14. Likewise, it will be appreciated that cam groove 56 can be designed such that during certain segments of one complete revolution of cam plate 36 pinion 80 can be caused to rotate at the same speed as pinion 74 so that, even though carriage 12 may be moving longitudinally on guide bars 14, no rotation of pinions 84 will occur and the two finger rods 16, 18 will remain in their projected or retracted positions. Cam groove 56 has other portions formed thereon that are designed to produce relative rotation between pinions 80 and 74 to thus actuate the finger bars 16, 18 to their projected and retracted positions.

It will be appreciated that the two cam grooves 54, 56 can be so designed and positioned relative to one another to produce any desirable sequence of operation. For example, the finger bars can be actuated if desired only when the carriage has reached either end of its stroke. On the other hand, the cam grooves can be so designed that the retraction stroke of the carriage can be initiated after the workpieces have been released by the gripping fingers 22 and back-up bar 24 but before the finger rods 16, 18 have reached their fully retracted positions.

In the embodiment illustrated in FIGS. 6 and 7 the vertical drive shaft 90 is fashioned with a cylindrical cam portion 92 adjacent its lower end, the latter being provided with the cam grooves 48, 50 previously described. A barrel cam 94 is journalled for rotation about the lower end of shaft 90. A spring biased pin 96 within barrel cam 94 engages the cam grooves 48, 50 so that, as drive shaft 90 is vertically reciprocated, barrel cam 94 is rotated continuously in the direction illustrated by the arrow in FIG. 6.

Barrel cam 94 is fashioned with a pair of cam grooves 98, 100 around its periphery. Within cam groove 98 there is a cam follower 102 mounted on the upper end of a gear rack member 104. Within cam groove 100 there is a cam follower 105 mounted on the end of a gear rack member 106. The remainder of the drive illustrated in FIG. 6 is identical to that illustrated in FIG. 5. Rack member 104 engages with pinion 70 on sleeve 72 and rack member 106 engages pinion 66 on shaft 68. As previously described, sleeve 72 is adapted to reciprocate carriage 12 through pinion 74 and rack bar 76. In the same way shaft 68 is adapted to actuate the work-engaging rods through pinion 80 and rack bar 82.

As is illustrated in FIG. 7, cam grooves 98, 100 have portions 108 which extend parallel to one another. When the cam followers 102, 105 are simultaneously engaged in the parallel cam groove portion 108, pinions 74 and 80 are rotating at the same speed. Under these conditions the carriage is being shifted longitudinally while the work gripping fingers remain in either the retracted or the projected work-engaging position. The cycle of operation of the carriage and the work gripping fingers and their acceleration and deceleration can, accordingly, be varied as desired by varying the shape of cam grooves 98, 100.

The embodiment illustrated in FIGS. 8 and 9 is somewhat similar to that shown in FIGS. 6 and 7 in that it includes the vertical drive shaft 90 with the cylindrical cam 92 formed at the lower end thereof. In this arrangement, however, a sleeve 110 is journalled for rotation around the lower end of drive shaft 90. A spring biased pin 112 within sleeve 110 is engaged within the spiral groove of cylinder cam 92 so that as the drive shaft 90 reciprocates sleeve 110 is caused to rotate continuously in one direction. A bevel gear 114 on sleeve 110 meshes with a second bevel gear 116 fixed at one end of a horizontally disposed barrel cam 118. Cam 118 is provided with two peripheral cam grooves 120, 122 in which are located cam followers 124, 126 respectively. Cam follower 124 is mounted at one end of an arm 128 having its other end connected to carriage 12 directly as at 130. Cam follower 126 is mounted at one end of an arm 132 connected to a rack bar 134. The finger operating rack rods 136 are interconnected with rack bar 134 by pinions 138. In this arrangement the second pair of finger rods are not illustrated. If the carriage is provided with two sets of finger rods, then the second set would be arranged as shown in FIG. 3 and driven by pinions 138.

In FIGS. 10 through 15 the use of two vertically reciprocating drive shafts is illustrated. These drive shafts are designated 140, 142 and are rigidly secured to a bracket 144 mounted on the vertically reciprocating ram 146 of the press. The lower end of shaft 140 is fashioned with a cylindrical cam 148 and the lower end of shaft 142 is fashioned with a cylindrical cam 150. Each of these cylindrical cams is adapted to reciprocate vertically through a gear box 152. Within gear box 152 there is journalled a pair of sleeves 154, 156 through which the cylindrical cams 148, 150 respectively extend. Cam 148 is fashioned with a cam groove 158 and cam 150 is fashioned with a cam groove 160. The cross-sectional shape of these cam grooves differ slightly from the cam grooves 48, 50 illustrated in FIG. 6.

In embodiment of FIGS. 10 through 15 each cam groove is fashioned with a base portion 162 of generally rectangular cross-section and an outer portion 164 with outwardly tapering sides. Within each sleeve 154, 156 the spring detent follower mechanism includes a spring pressed pin 166 the end of which engages in the base groove portion 162. Pin 166 is reciprocably mounted in a bushing 168 having a tapered nose 170 seated against the outwardly tapering sides of the groove portion 164. Adjacent the upper and lower ends of each cam groove the base portion 162 is inclined radially outwardly of the cam as at 172 (FIG. 13a) so that, as the spring detent mechanism approaches the upper and lower ends of the cam groove, pin 166 is retracted. When the spring detent mechanism reaches the extreme ends of the cam grooves, pin 166 will be again projected inwardly into the base portion 162 of the other cam groove. In this arrangement the thrust on the spring detent mechanism is exerted exclusively against the tapered nose 170 of bushing 168 and the tendency of the spring pressed pin 166 to bind in the cam grooves is eliminated.

Each sleeve 154, 156 has a helical gear 174, 176 formed thereon which meshes with a helical gear 178, 180 respectively. Gear 178 is pinned to a shaft 182 and gear 180 is formed at one end of a sleeve 184 journalled on the shaft 182. In a manner similar to that illustrated in FIG. 5, shaft 182 is adapted to drive the work-engaging fingers, and sleeve 184 is adapted to reciprocate the carriage.

In the arrangement illustrated in FIGS. 10 through 15 actuation of the carriage and actuation of the work gripping fingers are controlled exclusively by the relative positioning and configurations of cam grooves 158, 160. Referring to FIG. 13 wherein cam groove 158 is shown schematically, the upper and lower ends of this cam groove are formed by converging intersecting portions 186 and the intermediate portions of these grooves are defined by vertically extending straight portions 188. Thus, it follows that when the spring detent mechanism on sleeve 156 traverses the path defined by the points E, F and D, the carriage is actuated through its forward transfer stroke. From point D to point B the carriage is stationary. As the detent mechanism transverses the path defined by points B, A and C, carriage is retracted and from point C to E the carriage again remains stationary.

Referring now to FIG. 14 wherein the shape of cam groove 160 is illustrated, it will be observed that this cam groove is shaped generally as a parallelogram having two long straight sides 190 and two short straight sides 192. The straight portions 190 are parellel to the portions of groove 158 extending from point E to F and from point B to A. The straight portions 192 of groove 160 are parallel to those portions of groove 158 which extend from point A to C and point F to D. Thus, it follows that when the detent mechanisms on the two sleeves 154, 156 are simultaneously traversing parallel portions of the two cam grooves 158, 160, the work gripping fingers are stationary relative to the carriage. The work gripping fingers are actuated to project inwardly to work gripping relation while the spring detent mechanism in sleeve 156 is driven through that portion of groove 160 extending from point B to point D and the fingers are actuated to retract while the detent mechanism is driven from point E to point C. The operating cycle of the transfer mechanism with the cam grooves illustrated in FIGS. 13 and 14 is shown schematically in FIG. 15. It will be appreciated that the cycle as represented on FIG. 15 can be shifted circumferentially as desired and the time interval consumed by the various operating sequences by varying the shape of grooves 158, 160. Likewise it will be appreciated that the shape of the cam grooves can be modified to initiate projection of the work gripping fingers inwardly before the carriage reaches the end of its return stroke.

In FIGS. 16 through 20 there is illustrated a modified form of vertical drive arrangement according to the present invention. In this embodiment the vertical drive shaft is designated 200 and is adapted to reciprocate vertically through a gear box 202. At its lower end shaft 200 carries a detent assembly 204 which comprises a sleeve 206 which is journalled by bearings 208 for rotation about an axis transverse to a vertical axis of shaft 200. At one end sleeve 206 is formed as a cam follower roller 210. A pin 212 is slidably mounted in sleeve 206 and is biased in a radially outwardly direction through roller 210 by a spring 214.

The cam groove in which the detent assembly 204 operates is formed within a sleeve assembly 216 which comprises three concentric sleeves, an inner sleeve 218, an outer sleeve 220 and an intermediate sleeve 222. These sleeves are secured together into an integral unit by pins 224, 226 and journalled for rotation in gear box 202 about a vertical axis by thrust bearings 228. As is illustrated in FIG. 17, sleeve 218 is formed of two axially separate sleeve portions 218a and 218b. The justaposed ends of sleeve portions 218a and 218b are spaced apart to define therebetween a spiral cam groove 230 in which roller 210 is engaged. Cam groove 230 extends completely around sleeve 218 and axially thereof such that when drive shaft 200 is reciprocated, sleeve assembly 216 is cause to rotate continuously in one direction. Groove 230 is referred to as spiral since it is comprised of two spiral grooves which intersect at their upper and lower ends on diametrically opposite sides of sleeve assembly 216.

The intermediate sleeve 222 is also formed as two axially separate pieces 222a and 222b. The axially opposed inner edges of sections 222a and 222b are spaced apart to form a cam groove 232 therebetween which is narrower than and parallel to cam groove 230. Cam groove 232 is adapted to accommodate the spring pressed pin 212. Outer sleeve 220 is axially continuous and is provided with a pair of rectangular apertures 234 on diametrically opposite sides thereof which are spaced apart axially to correspond with portions of groove 232 that are spaced slightly in advance of the respective upper and lower ends of groove 232. Apertures 234 are adapted to accommodate stops 236 having a tapered end face 238 terminating in an abrupt shoulder 239. Stops 236 are secured to outer sleeve 220 by means of screws passing through openings 240 in stops 236 and threaded into the apertures 242 of sleeve 220. Stops 236 are mounted on sleeve 220 such that shoulder 239 extends transversely of groove 232 and the tapered face 238 inclines radially inwardly of the groove in the direction of travel of the detent assembly in the groove. As is best illustrated in FIG. 16, the inclined faces 238 of stops 236 are adapted to be engaged by the pin 212 to depress the pin as the detent assembly approaches the opposite ends of groove 232 and thus compel the detent assembly to follow a continuous path around the sleeve assembly as shaft 200 is reciprocated vertically. In other words, the stops 236 compel pin 212 to continue around groove 232 rather than reciprocating in the same run of the groove when drive shaft 200 reverses its direction of travel at opposite ends of its stroke.

The pins 224 adjacent the upper end of sleeve assembly 216 also serve to key a bevel gear 244 on the sleeve assembly. Gear 244 meshes with a second bevel gear 246 arranged to drive a cam, not illustrated. The cam driven by beveled gear 246 can be of the type shown in FIG. 6 or FIG. 8, for example.

The vertical drive arrangement shown in FIGS. 16 through 20 possesses the advantage of being very compact and at the same time being capable of delivering a relatively high torque. The rotary driving force is transmitted to the sleeve assembly 216 by the cam follower 210 bearing against the side edges of cam groove 230. Since the pin 212 rides more or less freely of cam groove 232, the tendency for pin 212 to bind in the cam groove as it travels over stop 236 is eliminated. As will be apparent from the embodiments hereinafter described, the drive arrangement shown in FIGS. 16 through 20 is not limited to a transfer mechanism wherein the output member of the vertical drive is a barrel cam.

Figure 22:
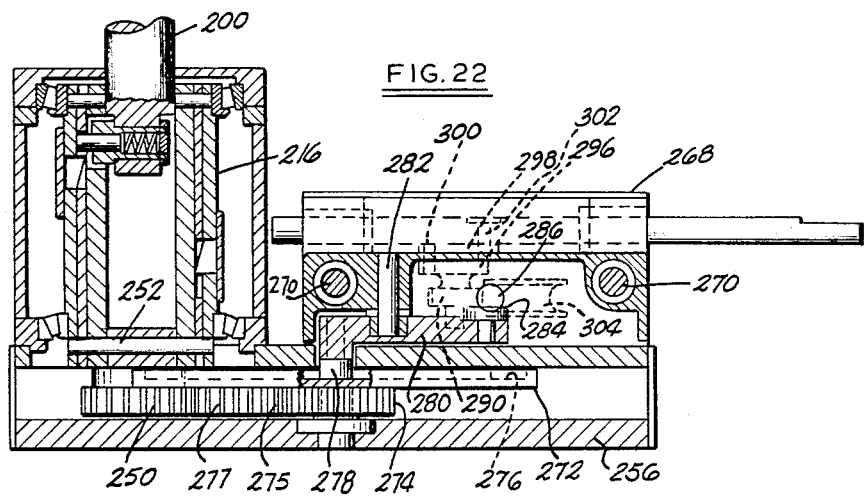
FIGURE 22 is a sectional view taken along the line 22—22 in FIG. 21.

For example, in the transfer mechanism illustrated in FIGS. 21 and 22 the vertical drive arrangement is substantially the same as that shown in FIG. 16. In this arrangement, however, a pinion gear 250 is pinned to the lower end of sleeve assembly 216 by means of a pin 252 (FIG. 22). A first cam plate 254 is journalled for rotation in gear box 256 about a vertical axis. A pinion gear 258 integral with cam plate 254 is driven from pinion 250 by a pair of idle gears 260, 262. Cam plate 254 is fashioned with a cam groove 264 on its upper face in which a cam follower 266 is engaged. Cam follower 266 is fixedly journalled on a portion of the carriage casting 268 so that as cam 254 rotates, carriage 268 reciprocates on its guide bars 270. Portions of cam groove 264 are concentric to the axis of rotation of cam plate 254 so that the carriage will dwell for a short period of time adjacent the opposite ends of its stroke.

A second cam plate 272 is mounted in gear box 256 for rotation about a generally vertical axis. Cam plate 272 has a pinion gear 274 integral therewith at its axis of rotation. A pair of idler gears 275, 277 form a gear train between pinion 250 and pinion 274 so that when drive shaft 200 is reciprocated, cam plate 272 is rotated continuously in one direction.

Cam plate 272 is provided with a cam groove 276 in which a cam follower 278 is engaged. Cam follower 278 is mounted at one end of a lever 280 pivoted intermediate its ends on carriage 268 as at 282. The other end of lever 280 is connected by a link 284 with a rack bar 286. Rack bar 286 extends lengthwise of carriage 268 and is supported for reciprocation thereon. Rack bar 286 meshes with two pair of pinion gears 288, 290 which in turn are operatively connected with the two sets of work finger actuating racks 292, 294. Pinions 288, 290 are each provided with an enlarged hub 296 to which is pivotally secured a link 298 as by a pin 300. Links 298 are also connected with the respective finger bar racks by pins as at 302. Links 298 on the two pair of finger actuating racks are arranged such that when one set of racks moves inwardly of carriage 268 the other is projected outwardly. In other words, the pins 300 on hubs 296 of gears 288 are disposed diametrically opposite the pins 300 on the hubs of gears 290 and the links 298 connected with the two pair of hubs extend in opposite directions from their pivotal connections with the hubs. Guide rollers 304 maintain the rack bar 286 in mesh with gears 288, 290.

It will be observed that lever 280 which interconnects the cam follower 278 with rack bar 286 is pivoted on the carriage 268 such that the longitudinal movement of rack bar 286 is amplified as compared with the movement of cam follower 278 lengthwise of carriage 268 in response to rotation of cam plate 272. This feature is important in installations where size limitations are present. Since, without amplification, the maximum throw of the cam which controls the finger bar movement must necessarily be greater than the throw of the cam which controls the stroke of the carriage, the provision of such amplification means, such as the lever 280, is desirable in order to reduce the size of the cam controlling the finger bar movement.

It will be appreciated that cam grooves 264 and 276 on the cam plates 254 and 272, respectively, are shaped and positioned relative to one another to produce the operating cycle desired. Thus, these two cam grooves are shaped such that during a portion of each revolution thereof the finger bars remain stationary relative to the carriage and at other portions the finger bars are projected and retracted on the carriage in order to grip and release the workpieces being transferred between the successive stations of the die. As is the case with previous embodiments described above, the desired acceleration and deceleration of the carriage and finger bars can be controlled by the shape of the respective cam grooves.

Figure 23:
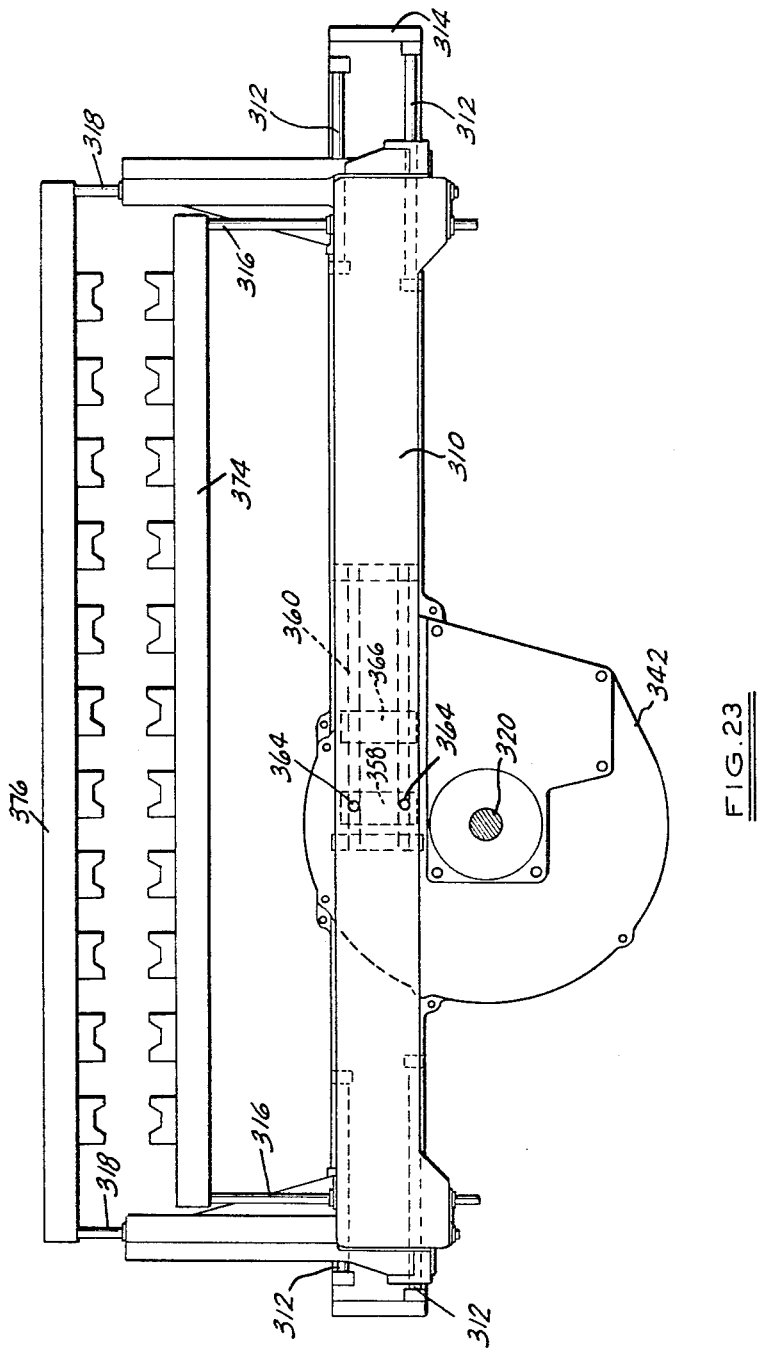
FIGURE 23 is a plan view of a further modified form of die transfer mechanism according to the present invention.
Figure 24:
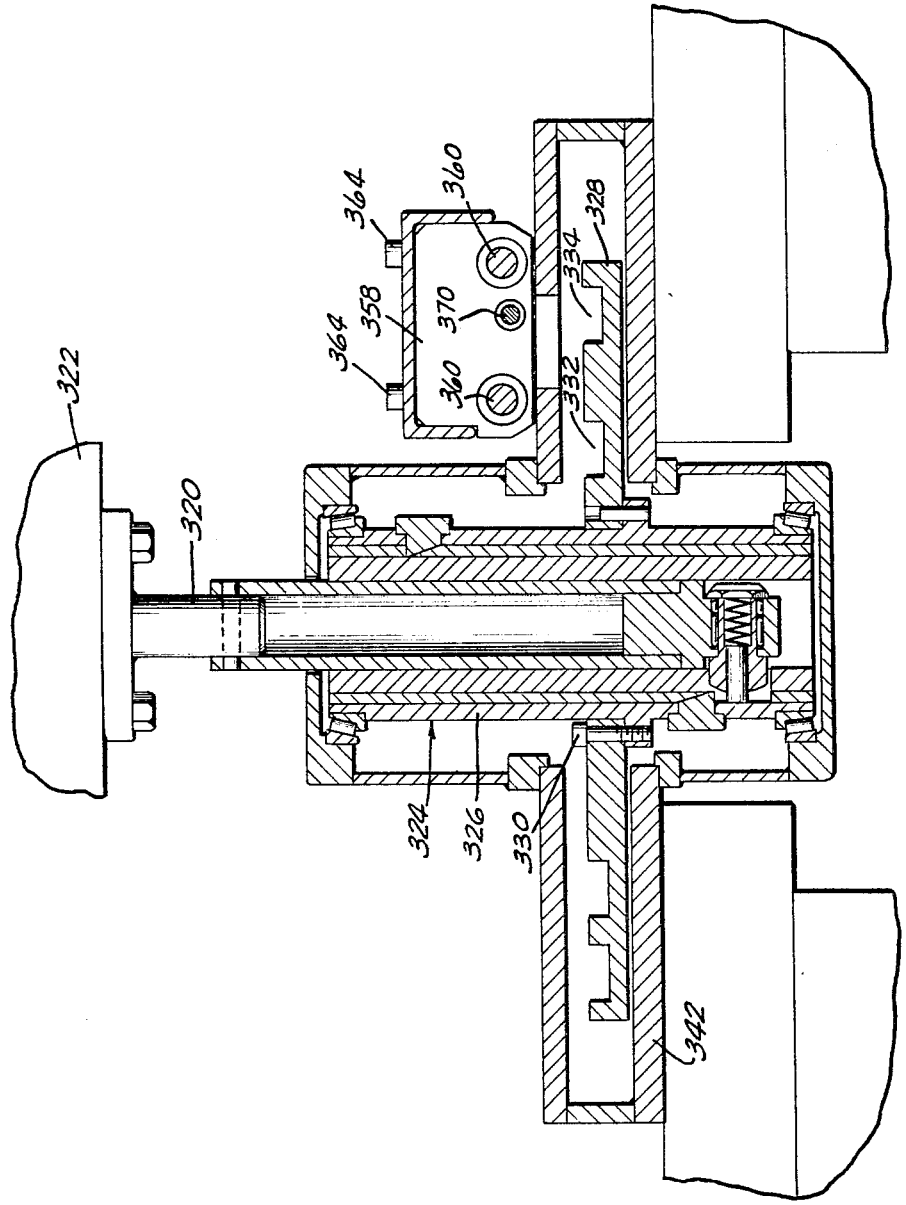
FIGURE 24 is a vertical sectional view illustrating the vertical driver arrangement for the transfer mechanism illustrated in FIG. 23.
Figure 25:
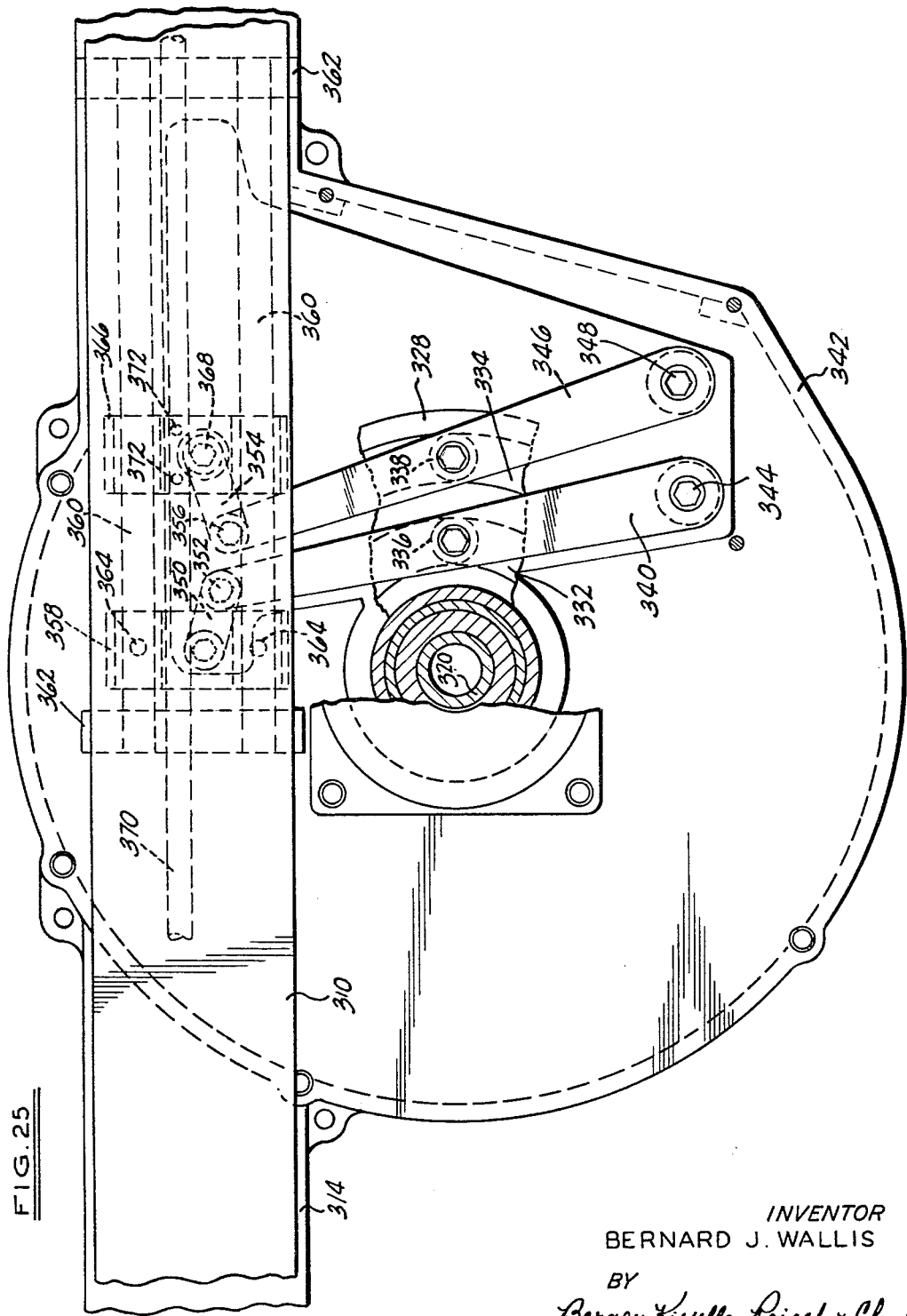
FIGURE 25 is a fragmentary plan view, with parts broken away, illustrating the cam drive arrangement for the carriage and the work gripping fingers of the transfer mechanism illustrated in FIG. 23.
Figure 26:
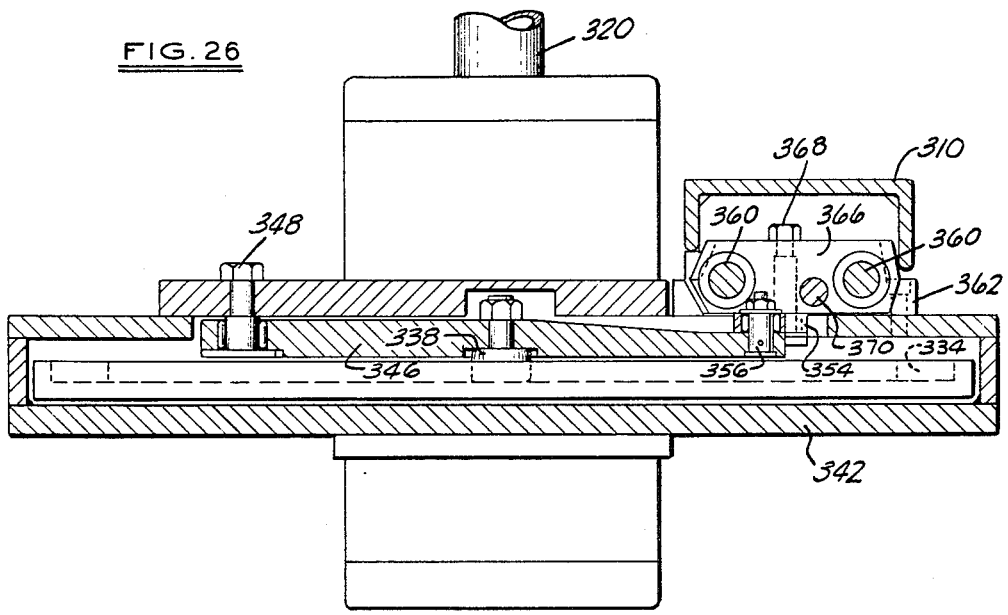
FIGURE 26 is a vertical sectional view of a portion of the transfer mechanism illustrated in FIG. 25.
Figure 27:
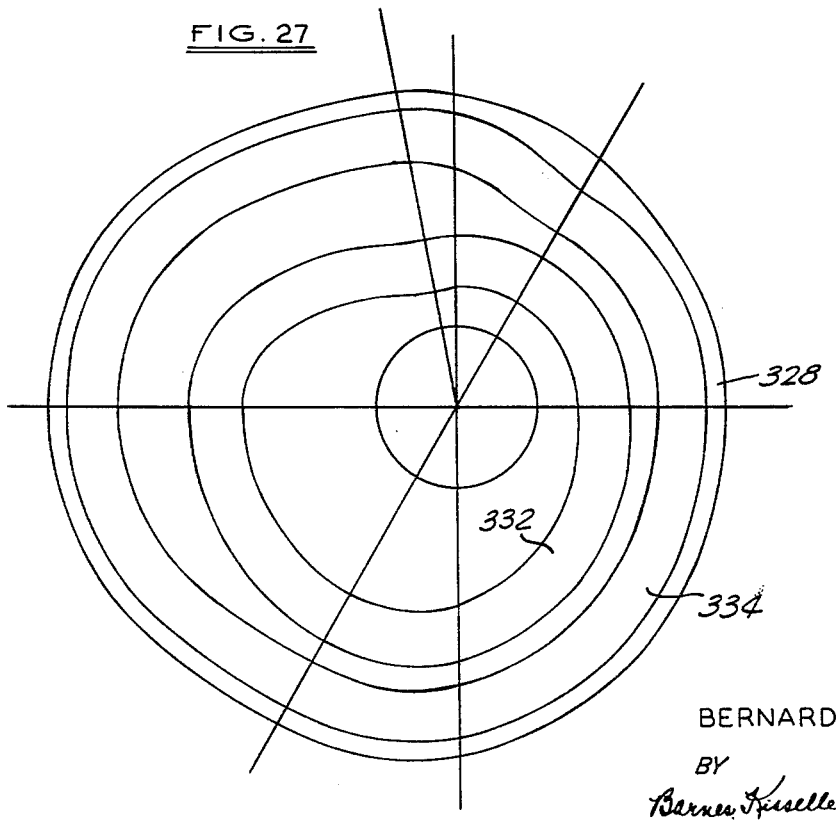
FIGURE 27 is a plan view of the cam illustrated in FIGS. 24, 25 and 26.

In the embodiment illustrated in FIGS. 23 through 27 means are provided for amplifying the movement of both the carriage and the finger bars in relation to the movement of the cam followers which actuate these members. In this transfer mechanism the carriage 310 is relatively long and individual pairs of guide bars 312 are mounted at each end of base 314 for supporting the carriage for reciprocation. As in the previous embodiment described, the carriage is provided with two pair of finger bar actuating racks 316, 318, one pair at each end thereof. The vertical drive arrangement for the transfer mechanism illustrated in FIG. 23 is best shown in FIG. 24. In this arrangement the vertical driver 320 connected with the ram 322 of the press extends downwardly through a sleeve assembly 324 which is generally of the same construction as that shown in FIG. 16. However, in the arrangement shown in FIG. 24 the outer sleeve 326 of the assembly has a cam plate 328 secured thereon as by screws 330.

Cam plate 328 is fashioned with inner and outer cam grooves 332, 334 respectively. Within cam groove 332 there is engaged a cam follower 336 and within cam groove 334 there is engaged a cam follower 338. Cam follower 336 is journalled intermediate the ends of a lever 340 pivoted on the stationary cam housing 342 as at 344. Cam follower 338 is mounted intermediate the ends of a lever 346 pivotally supported in housing 342 as at 348. At its outer end lever 340 has a link 350 connected thereto as at 352. Likewise, lever 346 has at its other end a link 354 pivotally connected thereto as at 356. Link 350 is pivotally connected to a sliding block 358 guided for movement on base 314 by a pair of guide bars 360 supported on brackets 362. Block 358 is connected to carriage 310 by screws 364 so that as block 358 is actuated lengthwise of guide bars 360, carriage 310 is reciprocated.

Link 354 is also pivotally connected with a sliding block 366 as at 368. Block 366 is slidably mounted on guide bars 360. A rack bar 370 extends through block 366 and is connected thereto by pins 372 such that when block 366 is actuated lengthwise of guide bars 360, rack bar 370 is caused to reciprocate. Rack bar 370 is suitably connected with the finger bar actuating racks 316, 318 so as to actuate the finger bars 374, 376 in response to movement of cam follower 338 in a direction radially of cam plate 328.

With an arrangement such as illustrated in FIGS. 23 through 27 it will be observed that the use of gears in the transfer mechanism can be entirely eliminated if desired. The elimination of gears in transfer mechanisms is preferred in many instances because gears are subject to excessive wear over prolonged periods of time whereas the grooves in cam plate 328 can be ground and hardened to reduce wear to a minimum.

As in the previous embodiments described, the shape of cam grooves 332, 334 and their relative disposition are determined to produce the desired operating cycle of the carriage and finger bars. Thus, to provide for a dwell of the carriage at the opposite ends of its stroke, diametrically opposite portions of groove 332 are formed concentric with the axis of cam plate 328. Likewise, the two cam grooves 332, 334 are shaped relative to one another such that through at least a portion of the stroke of the carriage in both directions slide block 366 moves at the same rate as slide block 358 so that the finger bars are retained in either the work-engaging or the retracted position.

Thus it will be seen that the vertical drive arrangement disclosed herein, wherein a vertical reciprocation of the press ram is converted into rotary motion of one or more cams in one direction, lends substantial versatility to a die transfer mechanism with respect to its operating cycle. Since the cam or cams which actuate the carriage and finger bars are capable of rotating continuously in one direction, the transfer mechanism can be operated so that the carriage is propelled forwardly and is retracted while the press ram is moving through its top and bottom dead-center positions. Since the movement of the finger bars is independent of the position of the press ram, the full stroke of the ram can be utilized for transfer of workpieces. This provides a maximum time period for indexing motion of the carriage. In turn this means that the carriage speed can be reduced, which in many instances is very important because the inertia of the part being transferred determines the maximum transfer velocity and, thus, the time required for transfer to take place. With the present arrangement, a greater portion of the ram stroke can be used for indexing the workpieces and, thus, a faster ram speed can be employed before the maximum transfer speed of the workpieces is reached. Likewise the work gripping fingers can be actuated to grip the workpieces as soon as they are clear of the dies and release the workpieces immediately prior to engagement by the dies.

I claim:

1. In a work transfer device for a press having a reciprocating ram, said device being of the type driven by the ram and having a carriage mounted for reciprocation in a rectilinear path and a work gripping element mounted on the carriage for bodily movement therewith and for reciprocation on the carriage in a direction generally transverse to the path of travel of the carriage such that when the carriage is adjacent one end of its stroke, the work gripping element is adapted to be projected into engagement with a workpiece, whereupon the carriage is adapted to be actuated to advance the workpiece in the direction of carriage travel, the work gripping element being adapted to be retracted out of engagement with the workpiece adjacent the opposite end of the carriage stroke to enable the carriage to be returned to its starting position, that improvement which comprises drive means, means for operably connecting said drive means with the ram of a press, means for supporting said drive means for axial reciprocation in a rotatably fixed position, driven means, means for supporting said driven means for rotation in an axially fixed position, spiral cam groove means on one of said drive and driven means and cam follower means on the other of said drive and driven means interengaged with said spiral cam groove means and interconnecting the drive and driven means such that the driven means are rotated in one direction in response to axial reciprocation of the drive means in opposite directions and means connecting said driven means with said carriage and said work gripping element to actuate said carriage and work gripping element in the above described sequence in response to axial reciprocation of the drive means.

2. A work transfer device as called for in claim 1 wherein said means connecting said driven means with said carriage and work gripping element includes a pair of cam and cam follower means and means connecting one of said cam and cam follower means with said carriage and the other cam and cam follower means with said work gripping element.

3. The combination called for in claim 1 wherein the spiral cam groove means are on said drive means and the first-mentoned cam follower means are on the driven means.

4. The combination set forth in claim 1 wherein said spiral groove means are on said driven means and said first-mentioned cam follower means are on said drive means.

5. The combination set forth in claim 1 wherein said drive means comprises axially shiftable shaft means and said driven means comprises rotatable shaft means.

6. The combination set forth in claim 1 wherein said drive means comprises axially shiftable shaft means and said driven means comprises rotatable sleeve means concentric with said shaft means.

7. The combination set forth in claim 1 wherein said drive means comprises an axially shiftable shaft and said driven means comprises a sleeve journalled for rotation about the reciprocating axis of said shaft and through which the shaft extends.

8. The combination set forth in claim 5 wherein said spiral groove means comprises a groove extending circumferentially continuously around the axis of one of said shaft means, said cam follower means comprising a detent assembly on the other shaft means projecting within said spiral groove, said spiral groove comprising two radially adjacent groove portions one of which is wider than the other, one of said groove portions having a radially tapered cam surface portion therein forming a shoulder adjacent each of the axially opposite end portions of said spiral groove, said detent assembly comprising two telescopically arranged members, one of said members being spring biased and adapted to project radially into the groove portion with the tapered cam surface portions thereon and the other detent member having a close fit with the other groove portion, said movable detent member cooperating with said shoulders to cause the detent assembly to continue around said spiral groove when the axially shiftable shaft means reverses its direction of movement at opposite ends of its stroke.

9. The combination called for in claim 8 wherein the narrower portion of the spiral groove is provided with the tapered cam surface portions and the spring biased detent member is telescopically arranged within the detent member engaging the wider groove portion.

10. The combination set forth in claim 7 wherein said cam follower means comprises a detent mechanism projecting radially from said shaft and said spiral groove means are formed on said sleeve.

11. The combination set forth in claim 8 wherein said spiral groove means comprise a spiral groove extending continuously around the inside of said sleeve and also extending axially of said sleeve a distance generally corresponding to the stroke of said drive shaft, said spiral groove having a radially inner portion and a radially outer portion of less width than the radially inner portion, the radially outer portion of said spiral groove having adjacent the opposite axial ends thereof a radially inwardly tapered surface which terminates in a radially extending shoulder, said detent mechanism comprising a detent member having a close fit with the radially innermost groove portion and a radially outwardly biased pin means engaged within the radially outer groove portion, said pin means being cammed radially inwardly at each of said cam surfaces and then biased outwardly at said shoulders to cause the detent mechanism to follow a continuous path around said spiral groove when said drive shaft reverses its direction of travel at opposite ends of its stroke.

12. The combination set forth in claim 9 wherein said sleeve comprises an assembly of an inner sleeve, an outer sleeve and a radially intermediate sleeve, said inner groove portion being formed on said inner sleeve, said outer groove portion being formed on said intermediate sleeve and said cam surfaces being formed on said outer sleeve, and means securing said sleeves together to rotate in unison.

13. The combination set forth in claim 5 wherein the spiral cam groove means comprises two spiral cam grooves extending circumferentially around one of said shaft means in opposite directions, the two cam grooves having their upper ends connected at one side of said shaft means and having their lower ends connected at a point at the diametrically opposite side of the shaft means.

14. The combination set forth in claim 7 wherein said means interconnecting said sleeve with said carriage and work gripping element comprises a pair of rotary cams driven by said sleeve, a cam follower associated with one of said cams and having a driving connection with the carriage and a second cam follower associated with the other cam and having a driving connection with said work gripping element.

15. The combination set forth in claim 14 wherein said cams are interconnected for movement in unison.

16. The combination set forth in claim 14 including a rotary support on which both of said cams are mounted for rotation therewith.

17. The combination set forth in claim 14 wherein said cams are fixed on said sleeve.

18. The combination set forth in claim 16 wherein said rotary support comprises a cylinder and the cams are formed as spiral grooves around the periphery of said cylinder.

19. The combination set forth in claim 16 wherein said rotary support comprises a plate and said cams comprise a pair of circumferentially continuous grooves formed in face portions of the plate disposed in a plane transversely to the axis of rotation of the plate.

20. The combination set forth in claim 14 wherein the cam controlling reciprocation of the carriage is designed to cause the carriage to travel through its forward and return stroke while the drive shaft is reversing its direction of travel at the opposite ends of its reciprocating stroke.

21. The combination set forth in claim 20 wherein the cam controlling operation of the work gripping element is designed to cause the work gripping element to assume a fixed work-engaging or retracted position relative to the carriage while the drive shaft is reversing its direction of travel at the opposite ends of its reciprocating stroke.

22. The combination set forth in claim 14 wherein the driving connection between the work gripping element and its associated cam follower includes a motion amplifying lever connected to the cam follower for reducing the throw of the cam follower required to produce the necessary displacement of the work gripping element.

23. The combination set forth in claim 22 wherein the driving connection between the carriage and its associated cam follower includes a motion amplifying lever connected to the last-mentioned cam follower for reducing the throw of the cam follower required to produce the necessary displacement of the carriage.

References Cited

UNITED STATES PATENTS 3,135,395  6/1964  Wallis ---------------- 214—1

FOREIGN PATENTS 847,329  9/1960  Great Britain.

ROBERT G. SHERIDAN, *Primary Examiner.*

G. F. ABRAHAM, *Assistant Examiner.*